(No Model.)
D. ROBERGE, Sr. & D. ROBERGE, Jr.
CAR AXLE.
No. 486,898. Patented Nov. 29, 1892.
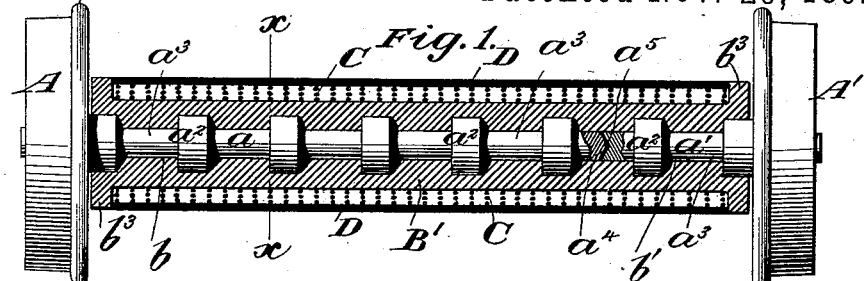
Fig. 2.
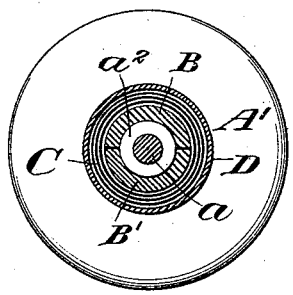
Fig. 3.
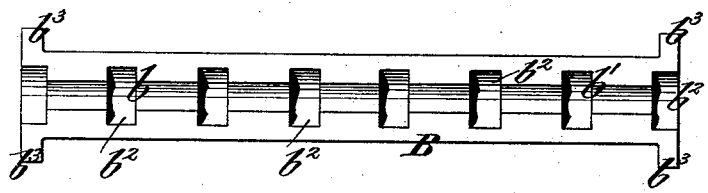
Witnesses:—
D. H. Haymood
C. Sundgren
Inventors:—
David Roberge sr.
David Roberge jr.
by attorneys
Brown Seward

UNITED STATES PATENT OFFICE.

DAVID ROBERGE, SR., AND DAVID ROBERGE, JR., OF NEW YORK, N. Y.

CAR-AXLE.

SPECIFICATION forming part of Letters Patent No. 486,898, dated November 29, 1892.

Application filed June 24, 1891. Renewed March 5, 1892. Serial No. 423,843. (No model.)

*To all whom it may concern:*

Be it known that we, DAVID ROBERGE, Sr., and DAVID ROBERGE, Jr., both of the city and county of New York, in the State of New York, have invented a new and useful Improvement in Car-Axles, of which the following is a specification.

Our invention relates to an improvement in car-axles, and more particularly to axles of the divided type, in which provision is made for the wheels fixed to the opposite ends of the axle to rotate independently of each other.

Car-axles in general use are of the undivided type, and the wheels are fixed thereto so that the axle and wheels must rotate together. It is found very difficult to cast wheels of exactly the same periphery, and unless the wheels be of exactly the same periphery it necessitates the slipping of the one to compensate for the more or less rapid advance of the other. In going around curves it is necessary that one of the wheels slip in order to compensate for the difference between the lengths of the rails forming the outer and inner sides of the track. Numerous attempts have been made to overcome these objectionable features by dividing the axle, so that one part and the wheel attached thereto might rotate relatively to the other part and the wheel attached thereto, but such attempts have not proved satisfactory particularly for the reasons that they have failed to provide a sufficiently extended and true bearing for the axle, which would prevent any considerable longitudinal thrust and at the same time furnish an axle sufficiently light and durable to render its adoption feasible.

It is our purpose in the present invention to overcome the objectionable features which have hitherto existed in divided axles and to furnish a light, stiff, and durable axle of the divided type.

A practical embodiment of our invention is represented in the accompanying drawings, in which—

Figure 1 is a view of the axle in longitudinal section. Fig. 2 is a cross-section of the same, the section being taken on the line $x\ x$ of Fig. 1; and Fig. 3 is a view of one of the half-sections of the bearing or coupling sleeve.

The axle in our preferred form is divided nearer one of the wheels than the other and is provided at intervals with annular abutments to prevent longitudinal thrust or displacement. The half-sections of the coupling or bearing sleeve are fitted more snugly to the shorter portion of the axle, or the shorter portion of the axle may be left a trifle larger than the longer portion, so that when the half-sections of the coupling or bearing sleeve are caused to snugly approach each other, they will grip the shorter portion of the axle and hold it tightly therein, so as to cause the coupling-sleeve to revolve, together with the short portion of the axle and its wheel, while the longer portion of the axle is allowed to rotate within the sleeve independently of the other section. The means which we prefer to adopt for uniting the sections of the coupling or bearing sleeve consist in circumferential bands either separately and shrunk on or of a continuous wire wound under tension.

A A' represent the wheels, fixed to the ends of the divided axle, the longer part of which is represented by $a$ and the shorter part by $a'$. The axle is provided throughout its length with a series of annular abutments $a^2$, arranged at intervals apart, the said abutments being formed either by turning down the body of the axle intermediate of the abutments, as shown at $a^3$, or by securing thereon by shrinking or otherwise annular bands. We prefer to form the ends of the axle where they unite the one with a socket $a^4$ and the other with a rounded end $a^5$, adapted to enter the socket. This feature is not, however, essential.

The coupling or bearing sleeve is preferably formed in two sections, (represented in the present instance by B and B'.) They are provided with bores $b$ and $b'$, the one adapted to embrace the longer portion of the axle sufficiently loosely to permit it to rotate therein and the other the shorter portion of the axle so tightly that when the sections are drawn snugly together they will prevent the rotation of that portion of the axle therein. The bores $b$ and $b'$ are provided at intervals with suitable semi-annular recesses $b^2$ for the reception of the annular projections on the axle. The said sleeves are further conveniently provided with exterior annular projections $b^3$ at their ends to form abutments, between which the series of wire coils may be conveniently laid.

The one or more series of wire coils which are preferably utilized to hold the coupling or bearing sleeve sections together are represented by C, the number of layers required depending upon the strain to which the axle is to be subjected and the size and quality of the wire to be employed. For the purpose of protecting the wire against the action of the weather and against injury to any one of its strands from contact with a foreign substance we provide a thin outer jacket D, which may be made of any suitable thin sheet metal.

It is obvious that where the sections of the sleeve are firmly united to the shorter section of the axle the axle might assume other well-known forms in cross-section than that represented herein—as, for example, polygonal or ribbed.

What we claim is—

1. The combination, with a divided axle and a sectional coupling or bearing sleeve for uniting the said axle, of layers of wire surrounding the sleeve-sections and serving to hold the sections compressed about the axle, substantially as set forth.

2. The combination, with a divided axle and a sectional coupling or bearing sleeve for uniting the parts of the axle, of one or more layers of wire surrounding the sleeve under tension to hold its parts in assembled adjustment, and a protecting-jacket surrounding the wire, substantially as set forth.

3. The combination, with a divided axle, the point of division being nearer one of the wheels than the other, of a sectional bearing-sleeve having a binding fit in its engagement with the shorter portion of the divided axle and a loose fit with the larger portion of said axle and means for drawing the sectional sleeve into binding contact with the shorter portion of the axle, substantially as set forth.

DAVID ROBERGE, Senior.
DAVID ROBERGE, Jr.

Witnesses:
FREDK. HAYNES,
GEORGE BARRY.